(12) United States Patent
Sasaki et al.

(10) Patent No.: US 12,054,915 B2
(45) Date of Patent: Aug. 6, 2024

(54) WORK ASSISTING SERVER AND WORK ASSISTING SYSTEM

(71) Applicant: KOBELCO CONSTRUCTION MACHINERY CO., LTD., Hiroshima (JP)

(72) Inventors: Hitoshi Sasaki, Hiroshima (JP); Yoichiro Yamazaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 253 days.

(21) Appl. No.: 17/790,807

(22) PCT Filed: Jan. 7, 2021

(86) PCT No.: PCT/JP2021/000362
§ 371 (c)(1),
(2) Date: Jul. 5, 2022

(87) PCT Pub. No.: WO2021/153187
PCT Pub. Date: Aug. 5, 2021

(65) Prior Publication Data
US 2023/0023778 A1    Jan. 26, 2023

(30) Foreign Application Priority Data
Jan. 30, 2020    (JP) ................ 2020-013236

(51) Int. Cl.
*E02F 9/20* (2006.01)
*E02F 9/26* (2006.01)
(Continued)

(52) U.S. Cl.
CPC .............. *E02F 9/205* (2013.01); *E02F 9/261* (2013.01); *G05D 1/0022* (2013.01); *G05D 1/0038* (2013.01); *G08B 21/187* (2013.01)

(58) Field of Classification Search
CPC ........ E02F 9/205; E02F 9/261; G05D 1/0022; G05D 1/0038; G08B 21/187
See application file for complete search history.

(56) References Cited

U.S. PATENT DOCUMENTS 10,954,651 B2 *    3/2021    Hashimoto ............. E02F 9/205
11,092,976 B2 *    8/2021    Koga ........................ E02F 9/20
(Continued)

FOREIGN PATENT DOCUMENTS

EP      4 050 892 A1     8/2022
JP      2005-242830 A    9/2005
(Continued)

OTHER PUBLICATIONS

Extended European Search Report dated Feb. 20, 2023 issued in corresponding EP Patent Application No. 21747613.4.

*Primary Examiner* — Ramsey Refai
(74) *Attorney, Agent, or Firm* — Carrier, Shende & Associates P.C.; Joseph P. Carrier; Fulchand P. Shende

(57) ABSTRACT

There is provided a server and a system capable of enabling an operator of a remote operating device to recognize which remote operating device remotely operates a work machine displayed on an output interface constituting the remote operating device. For example, a first work environment image indicating a situation of a work site acquired through an image pickup device 412 loaded on a work machine 40 is outputted on an output interface 220 constituting each of a plurality of remote operating devices 20.

10 Claims, 11 Drawing Sheets

(51) Int. Cl.
 *G05D 1/00* (2006.01)
 *G08B 21/18* (2006.01)

(56) References Cited

U.S. PATENT DOCUMENTS

| | | | |
|---|---|---|---|
| 11,423,341 B2 * | 8/2022 | Saiki | E02F 9/261 |
| 11,732,439 B2 * | 8/2023 | Sasaki | E02F 9/26 |
| | | | 701/2 |
| 2018/0051446 A1 * | 2/2018 | Yoshinada | E02F 9/264 |
| 2020/0018046 A1 | 1/2020 | Zumikawa | |
| 2020/0399863 A1 | 12/2020 | Aizawa et al. | |
| 2021/0010244 A1 | 1/2021 | Ito et al. | |
| 2021/0025131 A1 * | 1/2021 | Sasaki | E02F 9/261 |
| 2021/0256457 A1 | 8/2021 | Saiki et al. | |

FOREIGN PATENT DOCUMENTS

| | | |
|---|---|---|
| JP | 2010-123021 A | 6/2010 |
| JP | 2012-103919 A | 5/2012 |
| JP | 2019-004399 A | 1/2019 |
| JP | 2019-173379 A | 10/2019 |
| WO | 2019/172424 A1 | 9/2019 |
| WO | 2019/189430 A1 | 10/2019 |
| WO | 2019/239858 A1 | 12/2019 |

\* cited by examiner ded by a plurality of operators, the own machine which is the operation target of one operator and the other machines which are the operation targets of the other operators need to be recognized by the operators; however, it is difficult to share the same recognition among the plurality of operators. It is especially notable in the case where the plurality of work machines of the same model of the same maker are simultaneously displayed on the output interface. In this case, there is a possibility that the operator may operate the work machine using the remote operating device based on erroneous recognition, which may be improper from a viewpoint of target work execution.
WORK ASSISTING SERVER AND WORK ASSISTING SYSTEM

TECHNICAL FIELD

The present invention relates to a work assisting server for assisting a remote operation of a work machine using a remote operating device.

BACKGROUND ART

A terminal device for a remote monitoring assisting system has been proposed for sharing information with sufficient accuracy between a worker who is performing patrol inspection in a plant and a person who is waiting outside a work site (for example, see Patent Literature 1). The terminal device comprises a video input unit configured to input video data of the site, an input operation selection unit of a pen or mouse type, a detection unit configured to detect presence/absence of new video acquisition, a communication control unit configured to wirelessly transmit and receive data to/from outside, and an input/output screen display unit configured to display an input screen to input predetermined data.

CITATION LIST

Patent Literature

Patent Literature 1: Japanese Patent Laid-Open No. 2005-242830

SUMMARY OF INVENTION

Technical Problem

However, when a picked-up image acquired through an image pickup device is displayed on an output interface (image display device) constituting a remote operating device and a plurality of work machines are shown in the picked-up image, there is a possibility that an operator erroneously recognizes a work machine which is an operation target and surrounding work machines which are not the operation target, in the displayed image. In particular, in a case where the work machines are respectively operated by a plurality of operators, the own machine which is the operation target of one operator and the other machines which are the operation targets of the other operators need to be recognized by the operators; however, it is difficult to share the same recognition among the plurality of operators. It is especially notable in the case where the plurality of work machines of the same model of the same maker are simultaneously displayed on the output interface. In this case, there is a possibility that the operator may operate the work machine using the remote operating device based on erroneous recognition, which may be improper from a viewpoint of target work execution.

Therefore, it is an object of the present invention to provide a server and a system capable of enabling an operator of a remote operating device to recognize which remote operating device remotely operates a work machine displayed on an output interface constituting the remote operating device.

Solution to Problem

The present invention relates to a work assisting server for assisting a remote operation of a work machine using a remote operating device.

The work assisting server of the present invention is a work assisting server for assisting a remote operation of each of a plurality of work machines using corresponding each of a plurality of remote operating devices, and comprises:

a database configured to store and hold an identifier of the remote operating device, an identifier of a linked work machine, which is the work machine linked with the remote operating device, and a real space position of the linked work machine in association with one another;

a first assisting processing element configured to cause a work environment image according to a picked-up image of a work site acquired through an image pickup device to be outputted on an output interface of each of the plurality of remote operating devices based on communication with the corresponding each of the plurality of remote operating devices; and a second assisting processing element configured to recognize, in a case of receiving a label image request accompanied with the identifier of the linked work machine based on communication with each of the plurality of remote operating devices, the real space position of the linked work machine stored and held in the database in association with the identifier, determine whether or not the real space position of the linked work machine is included in a real space image pickup range of the image pickup device, and, when a result of the determination is positive, cause a label image indicating presence of the linked work machine at a specified position in the work environment image corresponding to the real space position of the linked work machine to be outputted on the output interface of each of the plurality of remote operating devices.

According to the work assisting server of the configuration, the work environment image indicating a situation of the work site acquired through the image pickup device is outputted on the output interface constituting each of the plurality of remote operating devices. According to the label image request accompanied with the identifier from the plurality of remote operating devices, whether or not the real space position of the linked work machine identified by the identifier is included in the real space image pickup range of the image pickup device is determined. When the result of the determination is positive, the label image indicating the presence of the linked work machine is outputted on the output interface of each of the plurality of remote operating devices. Thus, each of a plurality of operators of the plurality of remote operating devices can be made to recognize the presence of at least one linked work machine linked with at least one remote operating device in the work environment image.

Therefore, the plurality of operators can be enabled to recognize in common that the linked work machine linked with one remote operating device or the linked work machines linked with the remote operating devices are present in the work environment images outputted on the output interfaces constituting the remote operating devices.

DESCRIPTION OF EMBODIMENTS (Configuration of Work Assisting System)

Figure 1:
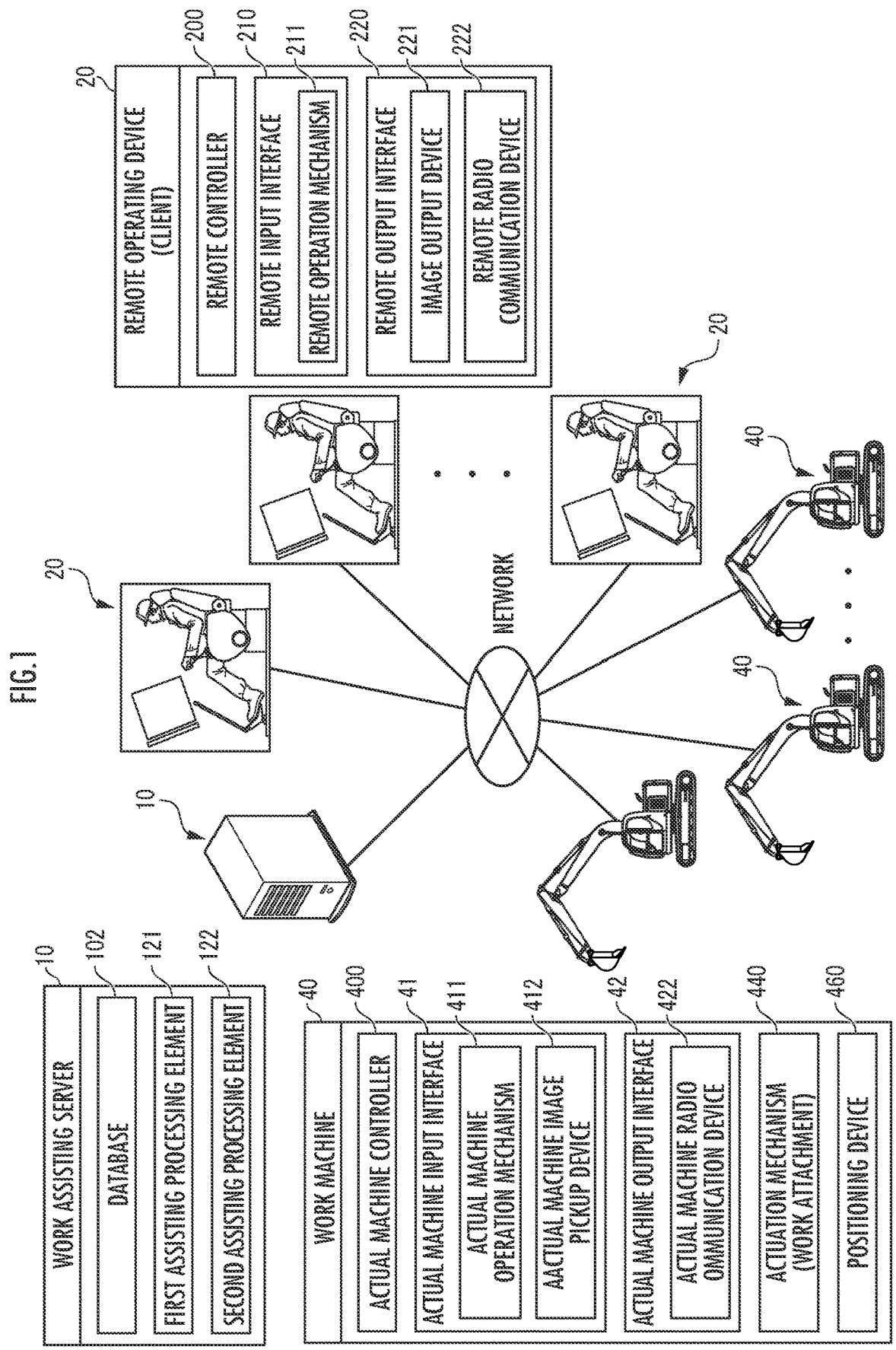
FIG. 1 is an explanatory drawing regarding a configuration of a work assisting system as one embodiment of the present invention.

A work assisting system as one embodiment of the present invention illustrated in FIG. 1 is constituted of a work assisting server 10 and a plurality of remote operating devices 20 for remotely operating a plurality of work machines 40. The work assisting server 10, the remote operating devices 20 and the work machines 40 are configured to perform network communication with each other. The plurality of remote operating devices 20 may be configured to perform communication with each other through a network different from a communication network with the work assisting server 10.

(Configuration of Work Assisting Server)

The work assisting server 10 comprises a database 102, a first assisting processing element 121 and a second assisting processing element 122. The database 102 stores and holds, in addition to a position and/or a track of each of the plurality of work machines 40, a picked-up image obtained by a camera provided in each of the work machines 40, a work environment image and a route guidance image provided to an operator operating each of the work machines 40, and the like. The database 102 may be constituted of a database server different from the work assisting server 10. Each assisting processing element is constituted of an arithmetic processing unit (a single-core processor, a multi-core processor or a processor core constituting it), reads required data and software from a storage device such as a memory and executes arithmetic processing to be described later according to the software with the data as a processing target.

(Configuration of Work Machine)

The work machine 40 comprises an actual machine controller 400, an actual machine input interface 41, an actual machine output interface 42, an actuation mechanism 440 and a positioning device 460. The actual machine controller 400 is constituted of an arithmetic processing unit (a single-core processor, a multi-core processor or a processor core constituting it), reads required data and software from a storage device such as a memory and executes arithmetic processing according to the software with the data as a processing target.

Figure 3:
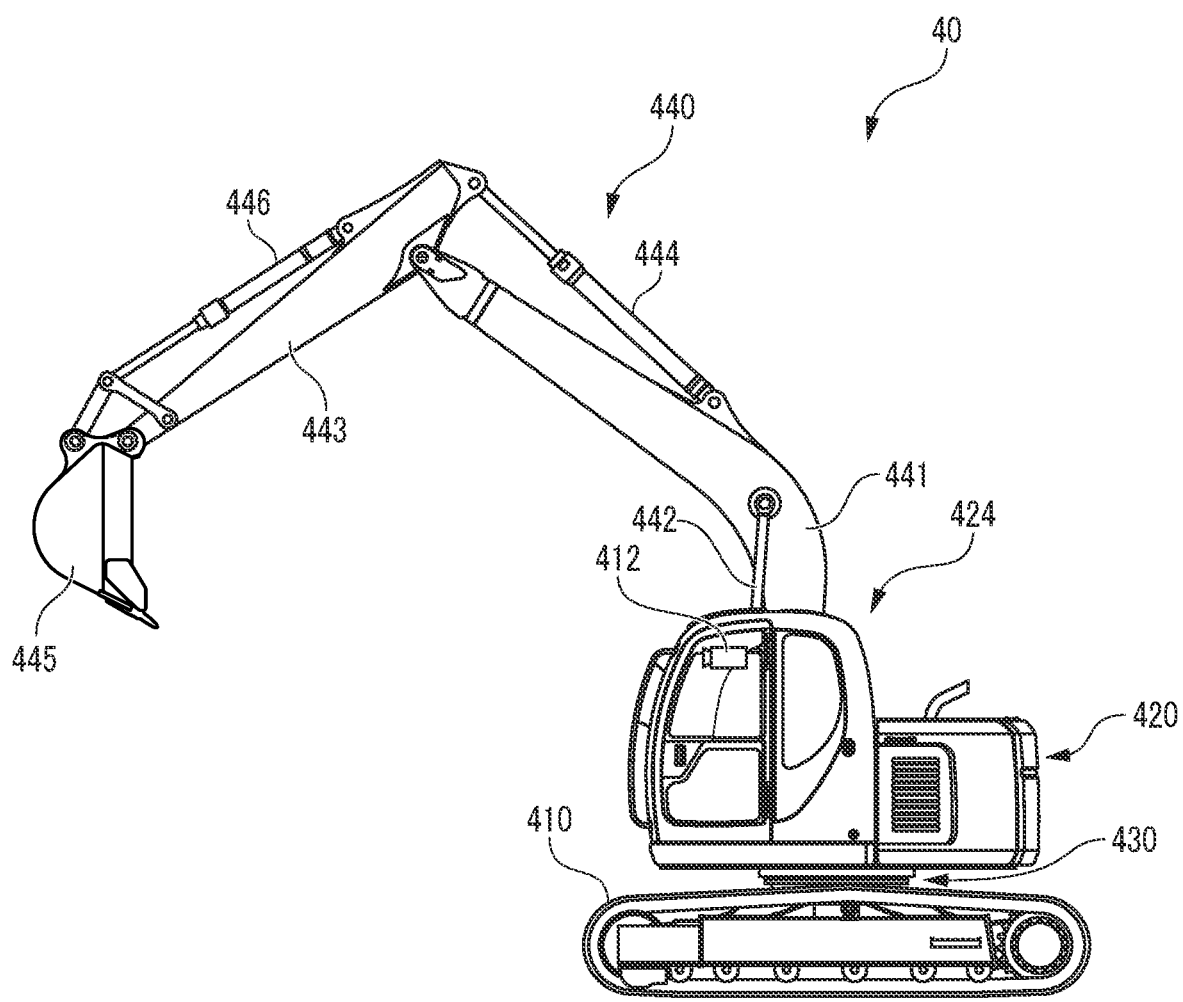
FIG. 3 is an explanatory drawing regarding a configuration of a work machine.

The work machine 40 is a crawler shovel (construction machine), for example, and comprises, as illustrated in FIG. 3, a crawler type lower traveling body 410 and an upper turning body 420 loaded on the lower traveling body 410 through a turning mechanism 430 so as to be turned. A cab (driving room) 424 is provided on a front left side part of the upper turning body 420. A work attachment 440 is provided on a front center part of the upper turning body 420.

The actual machine input interface 41 comprises an actual machine operation mechanism 411 and an actual machine image pickup device 412. The actual machine operation mechanism 411 comprises a plurality of operation levers arranged similarly to a remote operation mechanism 211, around a seat arranged inside the cab 424. A driving mechanism or a robot which receives a signal according to an operation mode of a remote operation lever and moves an actual machine operation lever based on the received signal is provided in the cab 424. The actual machine image pickup device 412 is installed inside the cab 424, for example, and picks up an image of an environment including at least a part of the actuation mechanism 440 over a front window of the cab 424.

The actual machine output interface 42 comprises an actual machine radio communication device 422.

The work attachment 440 as the actuation mechanism comprises a boom 441 mounted on the upper turning body 420 so as to be hoisted, an arm 443 turnably connected to a distal end of the boom 441, and a bucket 445 turnably connected to a distal end of the arm 443. On the work attachment 440, a boom cylinder 442, an arm cylinder 444 and a bucket cylinder 446 each constituted of extendable hydraulic cylinder are mounted.

The boom cylinder 442 is interposed between the boom 441 and the upper turning body 420 so as to be extended and contracted by receiving supply of hydraulic oil to turn the boom 441 in a hoisting direction. The arm cylinder 444 is interposed between the arm 443 and the boom 441 so as to be extended and contracted by receiving supply of hydraulic oil to turn the arm 443 with respect to the boom 441 around a horizontal axis. The bucket cylinder 446 is interposed between the bucket 445 and the arm 443 so as to be extended and contracted by receiving supply of hydraulic oil to turn the bucket 445 with respect to the arm 443 around the horizontal axis.

(Configuration of Remote Operating Device)

The remote operating device 20 as a client comprises a remote controller 200, a remote input interface 210 and a remote output interface 220. The remote controller 200 is constituted of an arithmetic processing unit (a single-core processor, a multi-core processor or a processor core constituting it), reads required data and software from a storage device such as a memory and executes arithmetic processing according to the software with the data as a processing target. The remote input interface 210 comprises the remote operation mechanism 211. The remote output interface 220 comprises an image output device 221 and a remote radio communication device 222.

The client may be constituted of a mobile terminal such as a smartphone or a tablet terminal or a wearable terminal such as a pair of VR goggles, which are linked with the remote operating device 20 or have an intercommunication function. The mobile terminal or the wearable terminal may have a communication function with the work assisting server 10.

The remote operation mechanism 211 includes a traveling operation device, a turning operation device, a boom operation device, an arm operation device and a bucket operation device. Each operation device includes an operation lever which receives a turning operation. The operation lever (traveling lever) of the traveling operation device is operated to move the lower traveling body 410 of the work machine 40. The traveling lever may serve also as a traveling pedal. For example, the traveling pedal fixed to a base part or a lower end part of the traveling lever may be provided. The operation lever (turning lever) of the turning operation device is operated to move a hydraulic type turning motor constituting the turning mechanism 430 of the work machine 40. The operation lever (boom lever) of the boom operation device is operated to move the boom cylinder 442 of the work machine 40. The operation lever (arm lever) of the arm operation device is operated to move the arm cylinder 444 of the work machine 40. The operation lever (bucket lever) of the bucket operation device is operated to move the bucket cylinder 446 of the work machine 40.

Figure 2:
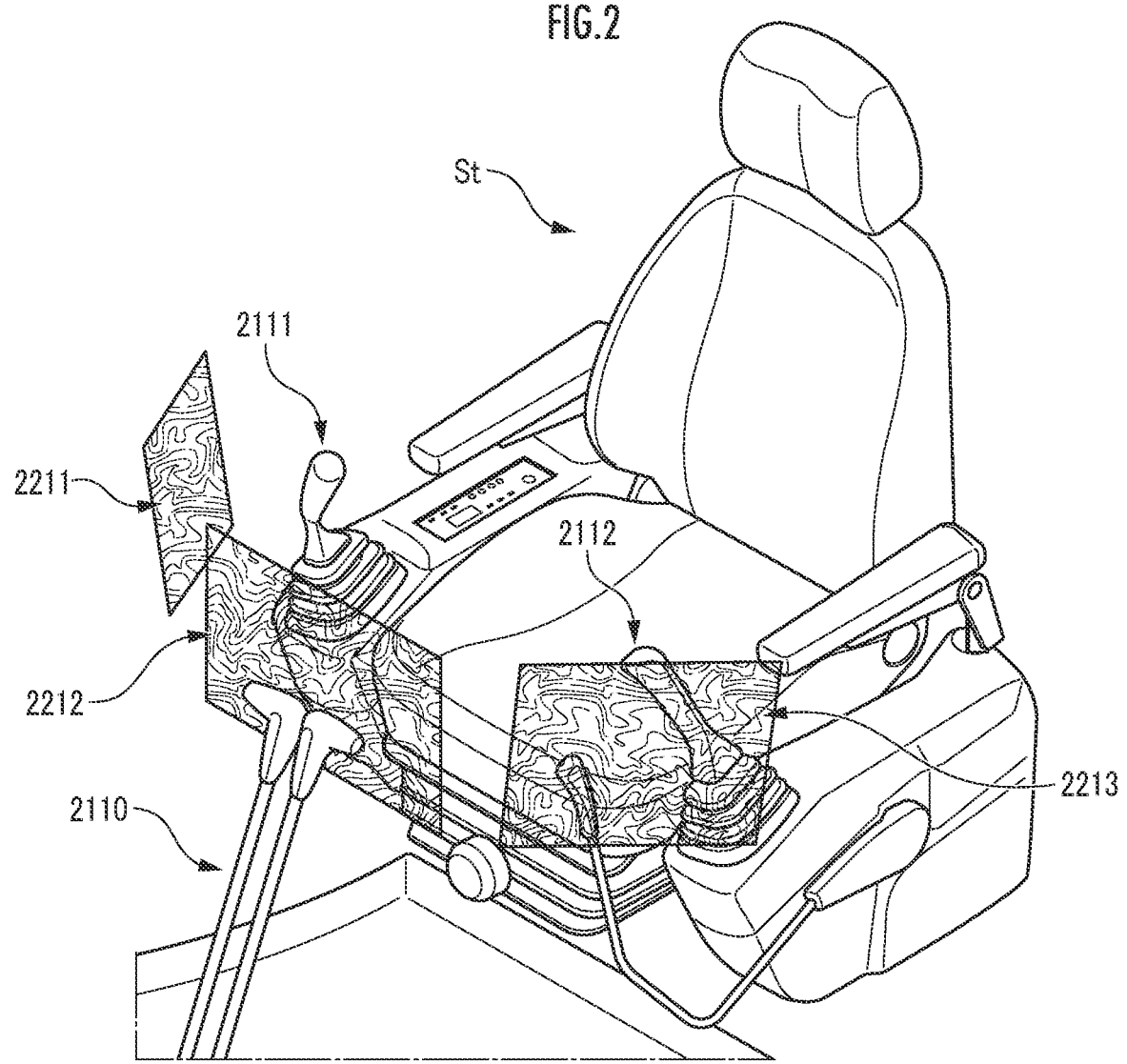
FIG. 2 is an explanatory drawing regarding a configuration of a remote operating device.

Each operation lever constituting the remote operation mechanism 211 is arranged around a seat St for an operator to sit, as illustrated in FIG. 2, for example. The seat St is in a form like a high back chair with armrests; however, it may be in any form that a remote operator OP2 can sit, such as a form like a low back chair without a headrest or a form like a chair without a backrest.

A pair of left and right traveling levers 2110 corresponding to left and right crawlers are arranged laterally side by side at a front of the seat St. One operation lever may serve as a plurality of operation levers. For example, a right side operation lever 2111 provided on the front of a right side frame of the seat St illustrated in FIG. 3 may function as the boom lever when operated in front and back directions and may function as the bucket lever when operated in left and right directions. Similarly, a left side operation lever 2112 provided on the front of a left side frame of the seat St illustrated in FIG. 3 may function as the arm lever when operated in the front and back directions and may function as the turning lever when operated in the left and right directions. A lever pattern may be arbitrarily changed by an operation instruction of the operator.

The image output device 221 is constituted of a diagonally right front image output device 2211, a front image output device 2212 and a diagonally left front image output device 2213 arranged at the diagonally right front, front and diagonally left front of the seat St, respectively, as illustrated in FIG. 2, for example. The image output devices 2211-2213 may further comprise a speaker (voice output device).

(Function)

The functions of the work assisting system of the configuration described above will be explained using flowcharts illustrated in FIG. 4 and FIG. 5. In the flowcharts, a block "C" is used to simplify description, means transmission and/or reception of data and means a conditional branch of executing processing in a branch direction on the condition that the data is transmitted and/or received.

(First Function (Remote Operation of Work Machine))

Figure 4:
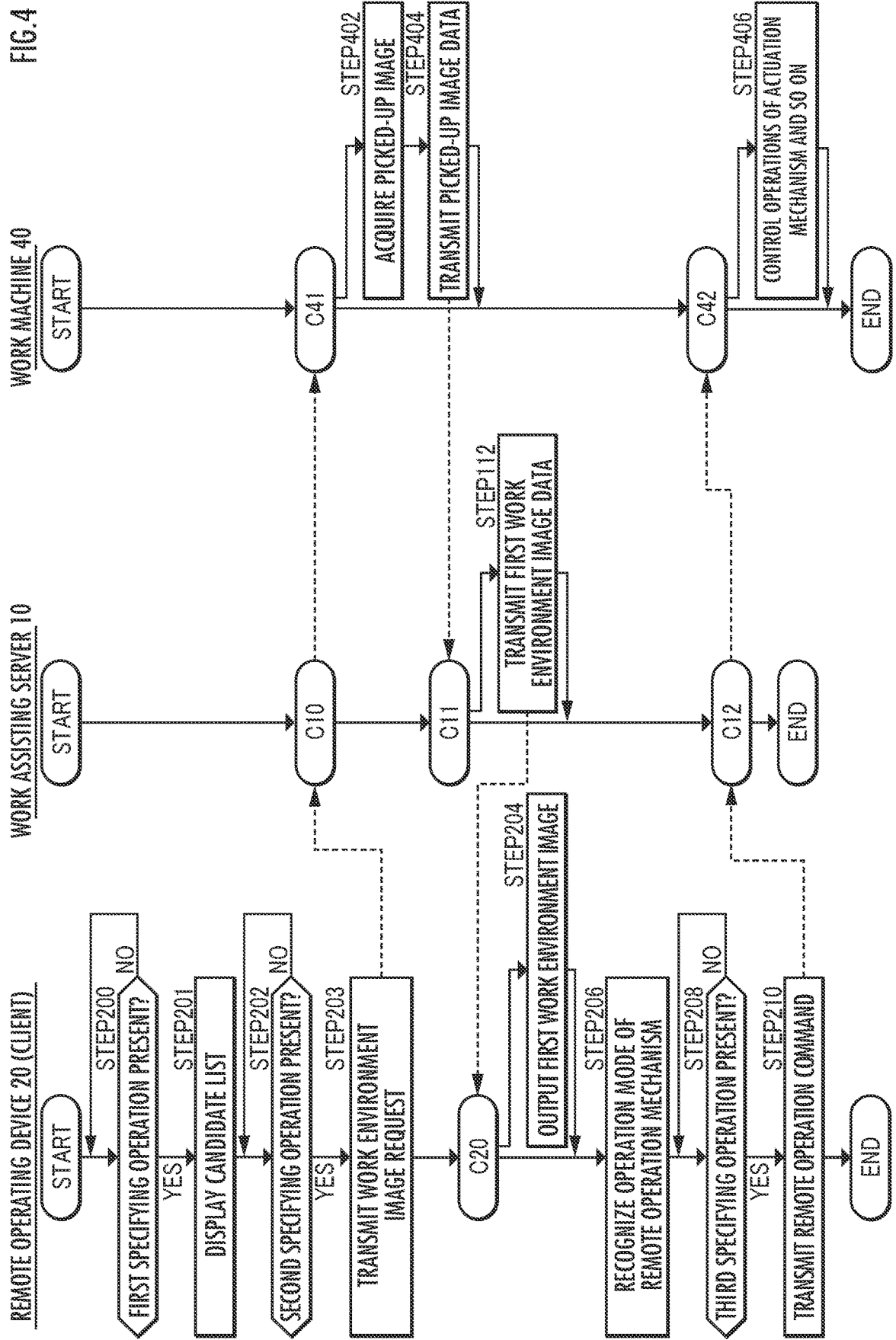
FIG. 4 is an explanatory drawing regarding a first function of the work assisting system.

In the remote operating device 20, presence/absence of a first specifying operation by the operator through the remote input interface 210 is determined (FIG. 4/STEP200). The "first specifying operation" is an operation of the remote input interface 210 for making the work machine 40 that the operator intends to remotely operate selectable and is the operation of tapping or the like through the remote input interface 210, for example. When the result of the determination is negative (FIG. 4/STEP200 . . . NO), a series of processing is ended.

On the other hand, when the result of the determination is positive (FIG. 4/STEP200 . . . YES), the remote operating device 20 acquires construction machine candidates that can be a target of the remote operation by the remote operating device 20, through the communication network, and causes various information such as positions, models and operation states of the construction machines to be displayed on the remote output interface 220 together with identifiers of the construction machines (FIG. 4/STEP201).

Then, in the remote operating device 20, the presence/absence of a second specifying operation by the operator through the remote input interface 210 is determined (FIG. 4/STEP202). The "second specifying operation" is an operation for specifying the construction machine to be the target of the remote operation out of the construction machine candidates that can be the target of the remote operation, and is the operation of tapping or the like through the remote input interface 210, for example. When the result of the determination is negative (FIG. 4/STEP202 . . . NO), a series of processing is ended. On the other hand, when the result of the determination is positive (FIG. 4/STEP202 . . . YES), a work environment image request is transmitted to the work assisting server 10 through the remote radio communication device 222 (FIG. 4/STEP203). The work environment image request includes at least one of the identifier of the remote operating device 20 and the identifier of the operator.

In the work assisting server 10, when the work environment image request is received, the work environment image request is transmitted to the work machine 40 corresponding to the work environment image request by the first assisting processing element 121 (FIG. 4/C10).

In the work machine 40, when the work environment image request is received through the actual machine radio communication device 422 (FIG. 4/C41), the actual machine controller 400 acquires a picked-up image through the actual machine image pickup device 412 (FIG. 4/STEP402). By the actual machine controller 400, picked-up image data indicating the picked-up image is transmitted to the remote operating device 10 through the actual machine radio communication device 422 (FIG. 4/STEP404).

In the work assisting server 10, when the picked-up image data is received (FIG. 4/C11), first work environment image data (data indicating whole or a part of the picked-up image itself or a simulated first work environment image generated based on it) according to the picked-up image data is transmitted to the remote operating device 20 (FIG. 4/STEP112).

In the remote operating device 20, when the first work environment image data is received through the remote radio communication device 222 (FIG. 4/C20), first work environment image according to the first work environment image data is outputted on the image output device 221 (FIG. 4/STEP204).

Figure 6:
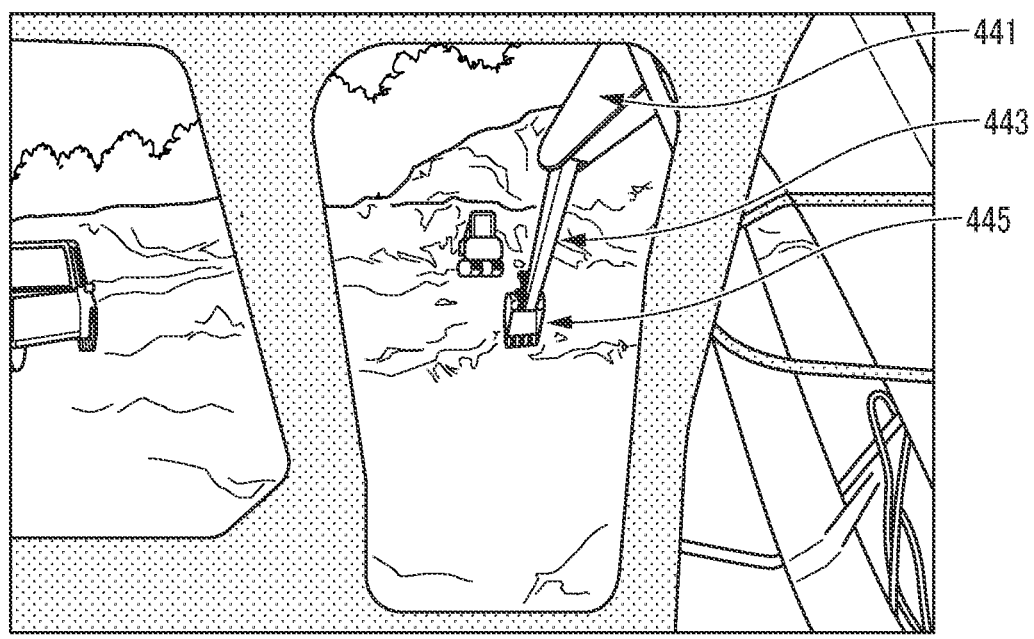
FIG. 6 is an explanatory drawing regarding a first work environment image acquired through an image pickup device loaded on the work machine.

Thus, as illustrated in FIG. 6, for example, the work environment image including the boom 441, the arm 443, the bucket 445 and the arm cylinder 444 which are parts of the work attachment 440 as the actuation mechanism is displayed on the image output device 221.

Figure 7:
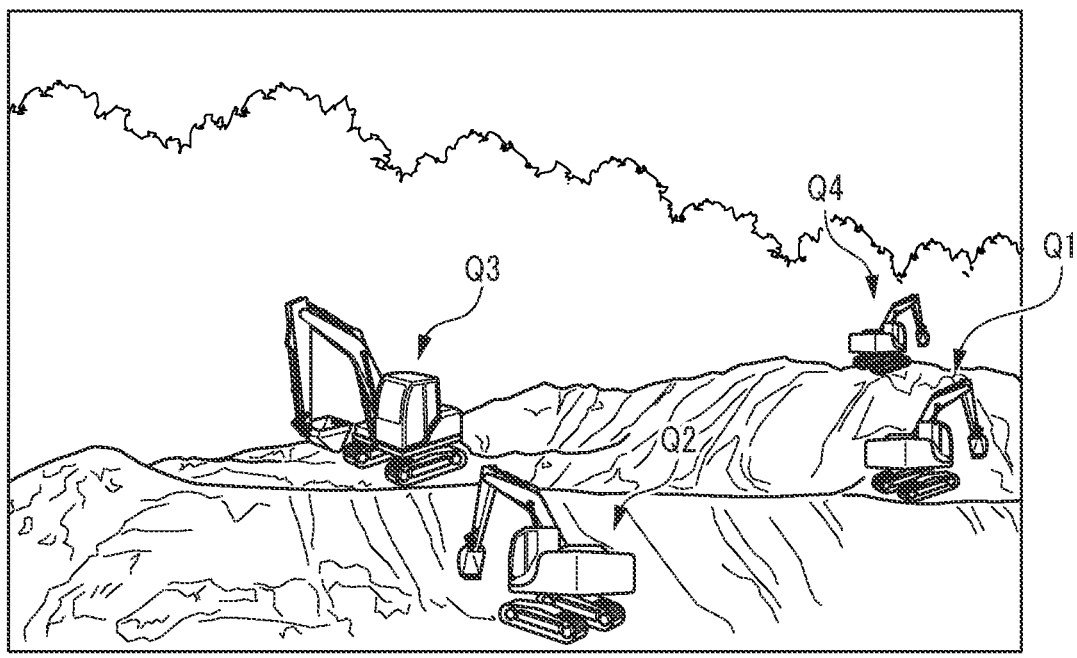
FIG. 7 is an explanatory drawing regarding a first work environment image acquired through an image pickup device installed at a work site.

In addition, based on the picked-up image acquired through an image pickup device C (see FIG. 8) installed at a work site, as illustrated in FIG. 7, for example, an image indicating a situation of the work site in which actual machine images Q1-Q4 of the plurality (four) of work machines 40 are present may be additionally or alternatively outputted on the image output device 221 as the first work environment image.

Figure 8:
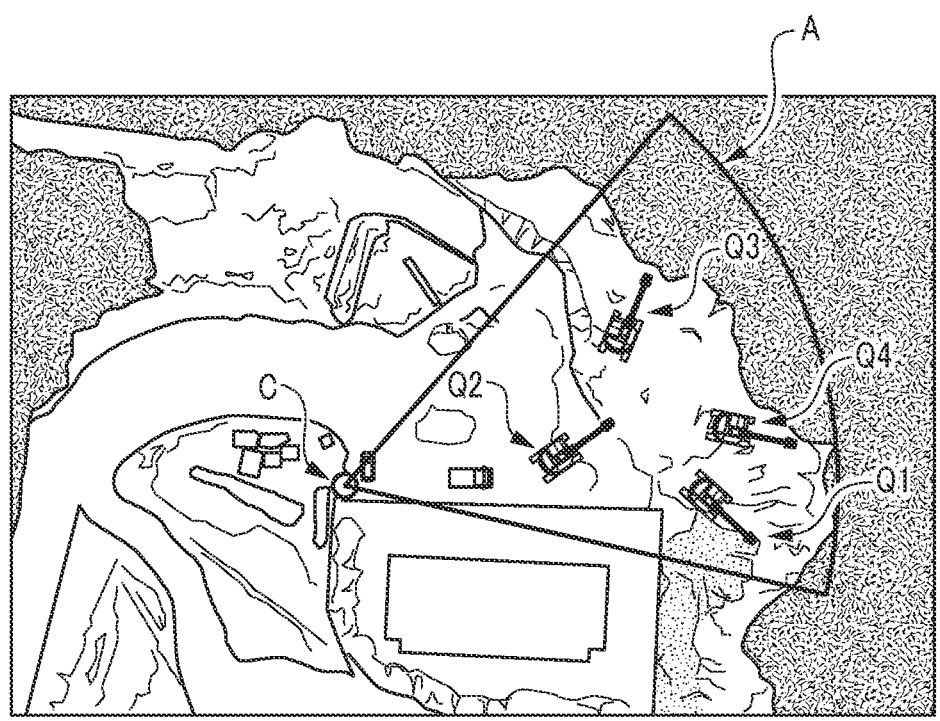
FIG. 8 is an explanatory drawing regarding a birds-eye picked-up image.

Further, as illustrated in FIG. 8, for example, a birds-eye picked-up image or a birds-eye map indicating a general situation of the work site and indicating the actual machine images or icons Q1-Q4 indicating the work machines 40 present at the work site may be additionally or alternatively outputted on the image output device 221 as the first work environment image. The birds-eye picked-up image may be acquired through the image pickup device loaded on an unmanned aircraft or the image pickup device installed at a structure such as a pole at the work site, for example. An image pickup part and a view angle of the picked-up image as the first work environment image may be arbitrarily changed. The birds-eye map may be generated based on the birds-eye picked-up image.

In the remote operating device 20, an operation mode of the remote operation mechanism 211 is recognized by the remote controller 200 (FIG. 4/STEP206), a signal according to the operation mode of the remote operation lever is transmitted to the work machine 40, and it becomes ready to drive the actual machine operation lever based on the transmitted signal. Then, in the remote operating device 20, the presence/absence of a third specifying operation by the operator through the remote input interface 210 is determined (FIG. 4/STEP208). The "third specifying operation" is an operation for making the work machine 40 selected as the target of the remote operation operable by the remote operating device 20, and is the operation of tapping or the like through the remote input interface 210, for example. By the "third specifying operation", the remote operation of the work machine 40 by the remote operating device 20 is started. Then, a remote operation command according to the operation mode can be transmitted to the work assisting server 10 through the remote radio communication device 222 (FIG. 4/STEP210).

In the work assisting server 10, when the remote operation command is received, the remote operation command is transmitted to the work machine 40 by the first assisting processing element 121 (FIG. 4/C12).

In the work machine 40, when the operation command is received through the actual machine radio communication device 422 (FIG. 4/C42), operations of the work attachment 440 or the like are controlled by the actual machine controller 400 (FIG. 4/STEP406). For example, the work of scooping soil in front of the work machine 40 by the bucket 445, turning the upper turning body 420 and then dropping the soil from the bucket 445 is executed.

(Second Function (Output of Actual Machine Specifying Image))

Figure 5:
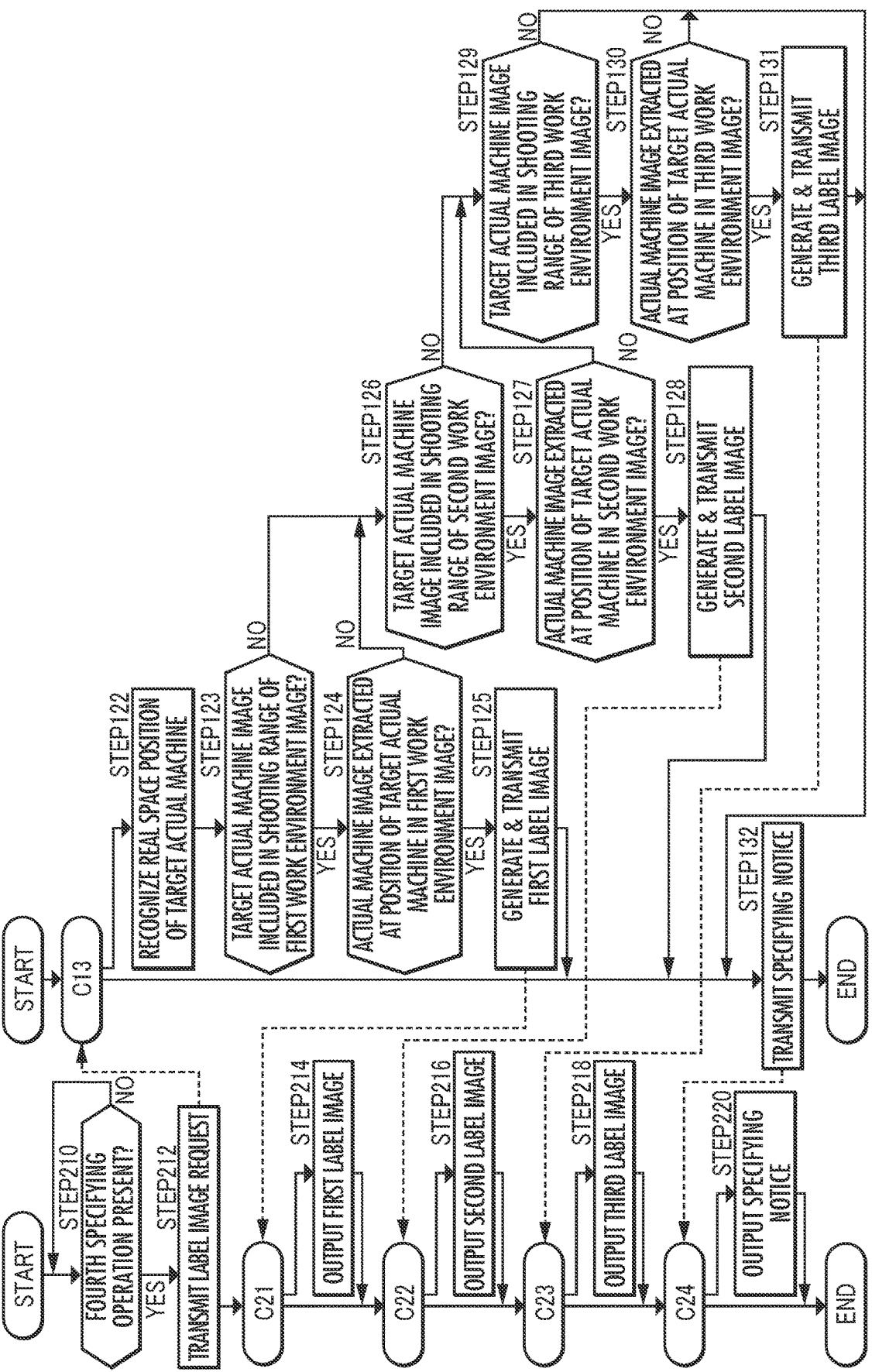
FIG. 5 is an explanatory drawing regarding a second function of the work assisting system.

In the remote operating device 20 (first client), the presence/absence of a fourth specifying operation by the operator through the remote input interface 210 is determined (FIG. 5/STEP210). The "fourth specifying operation" is an operation for sharing the same recognition among the plurality of operators about which operator is to operate each of the own machine that is the operation target of one operator and the other machines that are the operation targets of the other operators, and is the operation of tapping or the like through the remote input interface 210, for example. For example, the operator of the first client (first remote operating device 20) requests intercommunication with the operator of a second client (second remote operating device 20), and the operator of the second client (second remote operating device 20) accepts the request; then, the forth specifying operation is triggered.

Then, a label image request can be transmitted to the work assisting server 10 through the remote radio communication device 222 (FIG. 5/STEP212). The operation of selecting the target actual machine for which the operator wants to share the recognition corresponds to the label image request. For example, the operator selects the target actual machine for which the operator wants to share the recognition based on the various information such as the positions, models and operation states of the construction machines together with the identifiers of the construction machines, which are displayed on the remote output interface 220. When displaying target actual machine candidates, the remote output interface 220 at least displays the work machine 40 which is the operation target of the first client and the work machine 40 which is the operation target of the operator of the second client (second remote operating device 20) performing the intercommunication, and emphatic display makes it easy to share the recognition of the own machine and the other machine performing the communication. The label image request includes, in addition to an image identifier for identifying the first work environment image outputted on the image output device 221, at least one of a first identifier for identifying the first client or its operator and a second identifier for identifying the second client or its operator.

In the work assisting server 10, when the label image request is received (FIG. 5/C13), the real space position of the target actual machine is recognized by the first assisting processing element 121, by retrieval from the database 102 based on the first identifier (FIG. 5/STEP122).

When the intercommunication of the remote operating device 20 (client) and the work machine 40 is established, the identifier of the remote operating device 20 (or its operator), the identifier of the work machine 40 and the real space position of the work machine 40 are registered in the database 102 in association with one another. The real space position of the work machine 40 is measured by the positioning device 460 utilizing a GPS and an acceleration sensor, as needed, which are loaded on the work machine 40. By the work machine 40 transmitting the real space position or the time sequence thereof to the work assisting server 10, the real space position of the work machine 40 registered in the database 102 is updated. Thus, the real space position of the target actual machine can be recognized based on each of the first identifier and the second identifier.

Figure 10A:
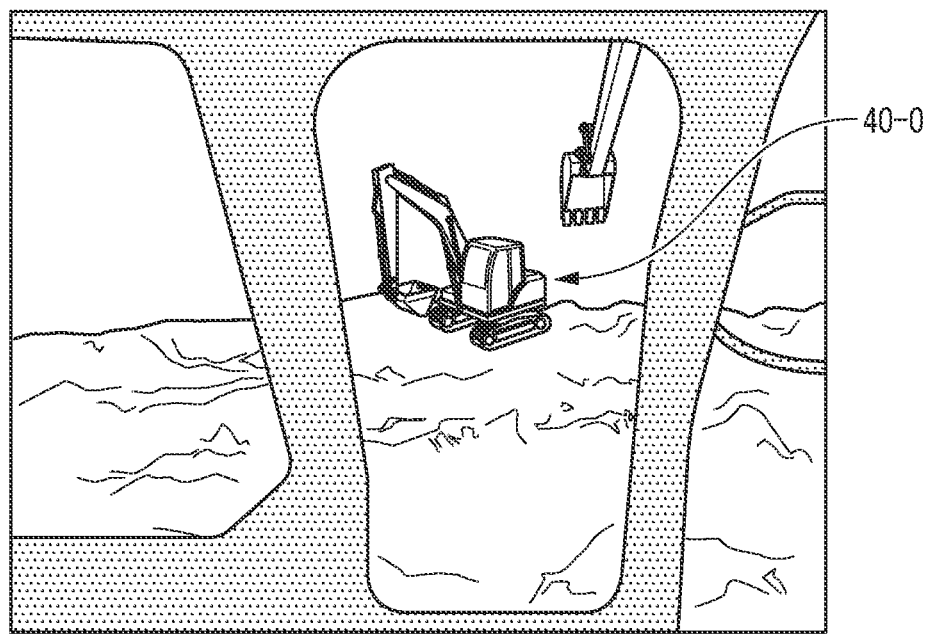
FIG. 10A is an explanatory drawing regarding one first work environment image including a target actual machine.
Figure 10B:
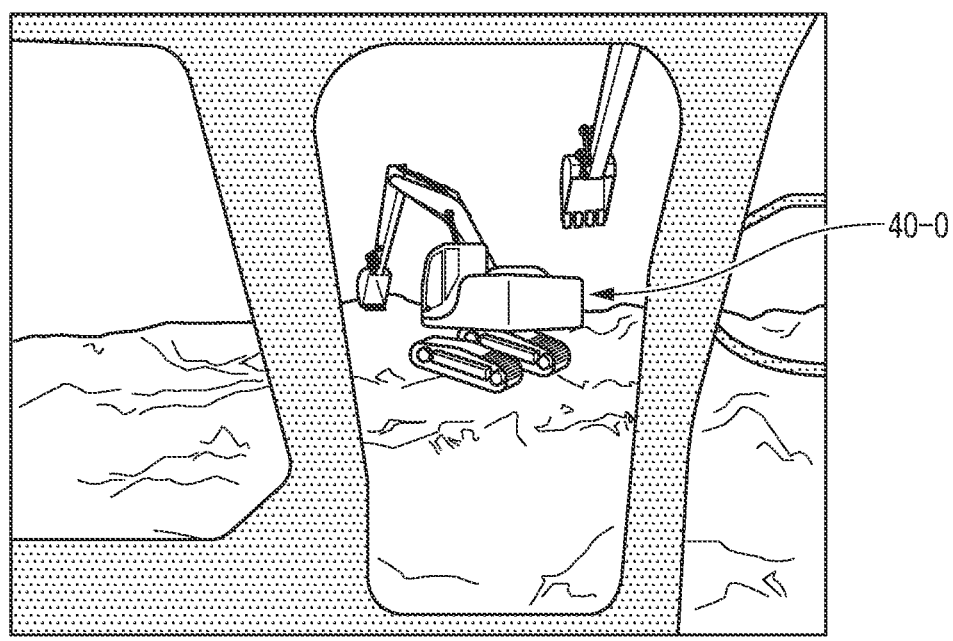
FIG. 10B is an explanatory drawing regarding another first work environment image including the target actual machine.

Subsequently, by the first assisting processing element 121, whether or not the target actual machine is included in the first work environment image identified by the image identifier included in the label image request is determined (FIG. 5/STEP123). The case where the target actual machine is included in the first work environment image is the case where the target actual machine 40 is included in the first work environment image (the work environment image acquired through the image pickup device 412 loaded on the work machine 40 different from the target actual machine), as illustrated in each of FIG. 10A and FIG. 10B.

Specifically, firstly, the shooting range of the first work environment image is identified. When the first work environment image is picked up by the image pickup device 412 of the work machine 40, the real space position of the work machine 40 and a shooting direction (up-down and left-right attaching directions to the work machine 40) of the image pickup device 412 are acquired by the positioning device 460. When the first work environment image is by the image pickup device C installed at the work site, as illustrated in FIG. 8, the real space position of the image pickup device C and the shooting direction of the image pickup device C are acquired. Further, by acquiring information regarding the view angle and scaling of the picked-up image, the shooting range of the first work environment image in a real space coordinate system is identified.

Then, whether or not the target actual machine is included in the shooting range of the first work environment image in the real space coordinate system is determined based on the real space position of the work machine 40 registered in the database 102 (FIG. 5/STEP123).

When the result of the determination is positive (FIG. 5/STEP123 . . . YES), the position of the target actual machine in the real space coordinate system is transformed to the position in a first work environment image coordinate system. Then, image analysis processing is executed on the first work environment image and whether or not an actual machine image Qi indicating the work machine 40 is extracted at the position of the target actual machine in the first work environment image coordinate system is determined (FIG. 5/STEP124).

When the result of the determination is positive (FIG. 5/STEP124 . . . YES), a first label image indicating that the actual machine image Qi is the target actual machine (the own machine or the other machine) is generated by the second assisting processing element 122, and data indicating the first label image is transmitted to the first client by the second assisting processing element 122 (FIG. 5/STEP125). Then, a specifying notice indicating that the first label image is superimposed on the first work environment image is transmitted (FIG. 5/STEP132).

Figure 9A:
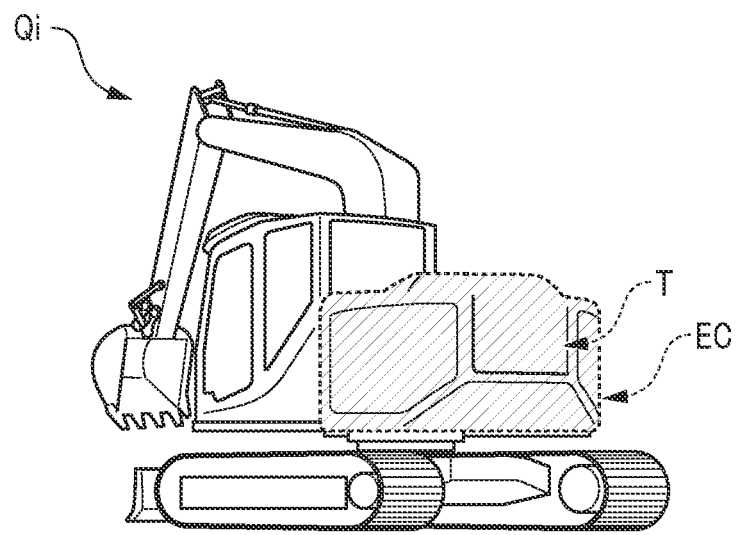
FIG. 9A is an explanatory drawing regarding a first label image.
Figure 9B:
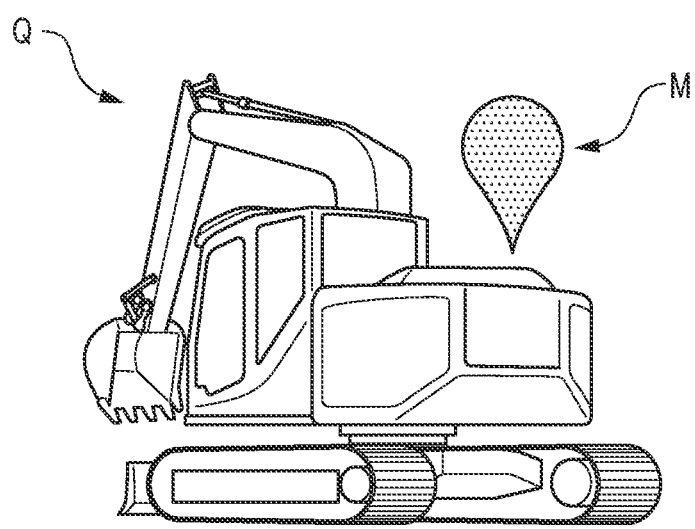
FIG. 9B is an explanatory drawing regarding a second label image.

In the remote operating device 20 (first client), when first label image data is received through the remote radio communication device 222 (FIG. 5/C21), the first label image which emphatically displays the presence of the target actual machine in the first work environment image is outputted on the image output device 221 constituting the output interface 220 (FIG. 5/STEP214). Thus, as illustrated in FIG. 9A, for example, the result of superimposing a texture image T on the first work environment image in an area surrounded by a set EC of edge points in the actual machine image Qi is outputted as the first label image. A color of the texture image T is changeable according to preference of the operator. In addition, as illustrated in FIG. 9B, for example, the result of superimposing a mark image M on the first work environment image near the actual machine image Qi is outputted as the first label image. For the mark image M, a symbol (character) according to preference of the operator can be set.

Figure 11:
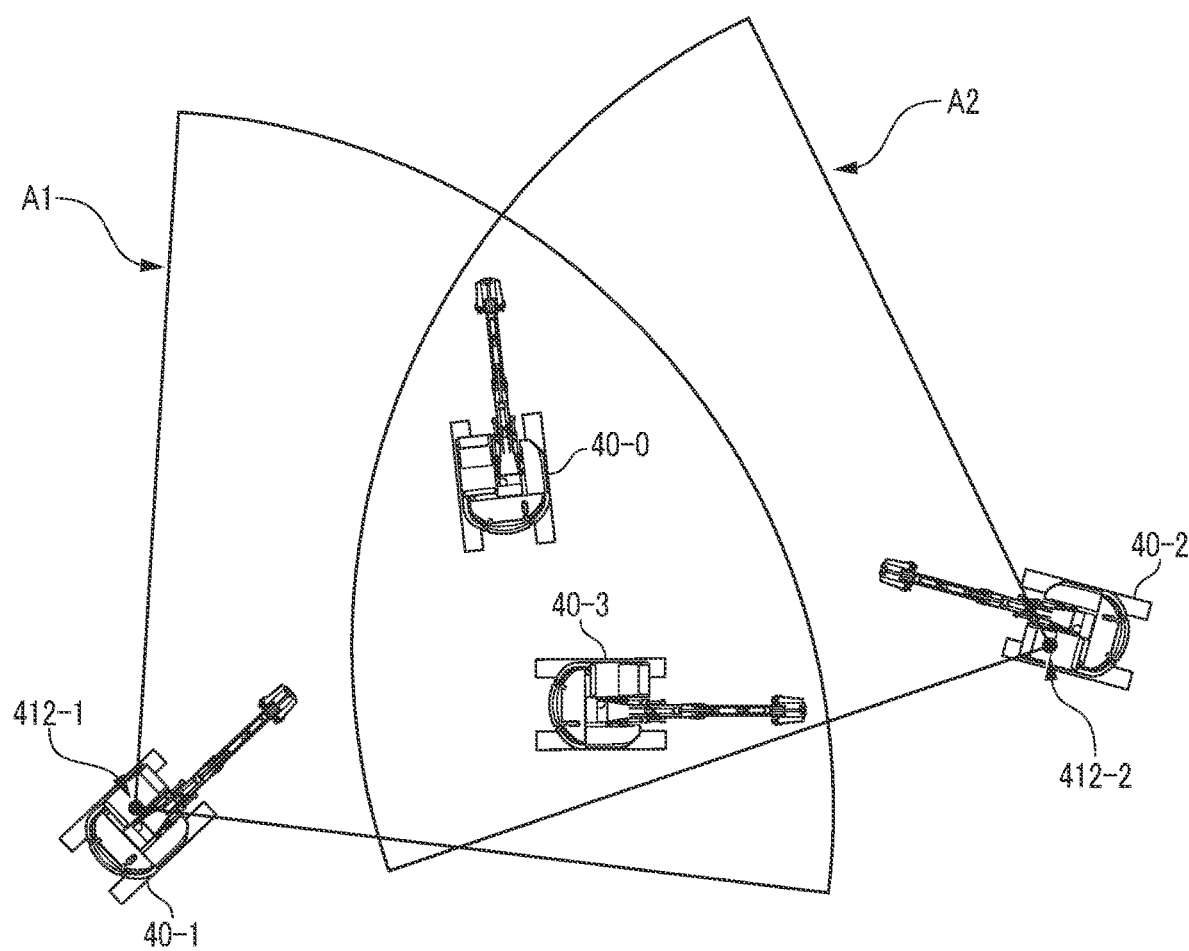
FIG. 11 is an explanatory drawing regarding an image pickup range of the image pickup device loaded on the work machine installed at the work site and the target actual machine.

The case where the result of the determination is negative (FIG. 5/STEP124 . . . NO) is the case where a work machine 40-3 is not facing the target real machine 40-0, as illustrated in FIG. 11, or the case where it is blocked by an obstacle such as the other work machine, for example.

When the target actual machine is not included in the shooting range of the first work environment image in the real space coordinate system (FIG. 5/STEP123 . . . NO) or when the actual machine image Qi indicating the work machine 40 is not extracted at the position of the target actual machine in the first work environment image coordinate system (FIG. 5/STEP124 . . . NO), whether or not the target actual machine is included in the shooting range of a second work environment image in the real space coordinate system is determined (FIG. 5/STEP126). Here, the second work environment image is a work environment image provided for the second client and is a work environment image of the work machine 40 which is the target of the remote operation by the operator of the second client. The second work environment image for the second client is similar to the first work environment image for the first client, and the description of a generation method of the image is omitted.

When the result of the determination is positive (FIG. 5/STEP126 . . . YES), the position of the target actual machine in the real space coordinate system is transformed to the position in a second work environment image coordinate system. Then, the image analysis processing is executed on the second work environment image and whether or not the actual machine image Qi indicating the work machine 40 is extracted at the position of the target actual machine in the second work environment image coordinate system is determined (FIG. 5/STEP127).

When the result of the determination is positive (FIG. 5/STEP127 . . . YES), a second label image indicating that the actual machine image Qi is the target actual machine (the own machine or the other machine) is generated by the second assisting processing element 122, and data indicating the second label image is transmitted to the first client by the second assisting processing element 122 (FIG. 5/STEP128). Then, a specifying notice indicating that the second label image is superimposed on the second work environment image is transmitted (FIG. 5/STEP132). In the remote operating device 20, when the second label image data is received through the remote radio communication device 222 (FIG. 5/C22), the second label image which emphatically displays the presence of the target actual machine in the second work environment image is outputted instead of or in addition to the second work environment image on the image output device 221 constituting the output interface 220 (FIG. 5/STEP216). Thus, as illustrated in FIG. 9A, for example, the result of superimposing a texture image T on the second work environment image in an area surrounded by a set EC of edge points in the actual machine image Qi is outputted as the second label image. The color of the texture image T is changeable according to preference of the operator. In addition, as illustrated in FIG. 9B, for example, the result of superimposing a mark image M on the second work environment image near the actual machine image Qi is outputted as the second label image. For the mark image M, a symbol (character) according to preference of the operator can be set.

When the target actual machine is not included in the shooting range of the second work environment image in the real space coordinate system (FIG. 5/STEP126 . . . NO) or when the actual machine image Qi indicating the work machine 40 is not extracted at the position of the target actual machine in the second work environment image coordinate system (FIG. 5/STEP127 . . . NO), whether or not the target actual machine is included in the shooting range of a third work environment image in the real space coordinate system is determined (FIG. 5/STEP129). Here, the third work environment image is a work environment image not provided for the first client and the second client intercommunicating with the first client. The third work environment image is a work environment image provided for the second client not intercommunicating with the first client or a work environment image that can be provided for the first client and the second client intercommunicating with the first client.

When the result of the determination is positive (FIG. 5/STEP129 . . . YES), the position of the target actual machine in the real space coordinate system is transformed to the position in a third work environment image coordinate system. Then, the image analysis processing is executed on the third work environment image and whether or not the actual machine image Qi indicating the work machine 40 is extracted at the position of the target actual machine in the third work environment image coordinate system is determined (FIG. 5/STEP130). When the result of the determination is positive (FIG. 5/STEP130 . . . YES), a third label image indicating that the actual machine image Qi is the target actual machine (the own machine or the other machine) is generated by the second assisting processing element 122, and data indicating the third label image is transmitted to the first client by the second assisting processing element 122 (FIG. 5/STEP131). Then, a specifying notice indicating that the third label image is superimposed on the third work environment image is transmitted (FIG. 5/STEP132). In the remote operating device 20, when third label image data is received through the remote radio communication device 222 (FIG. 5/C23), the third label image which emphatically displays the presence of the target actual machine in the third work environment image is outputted instead of or in addition to the third work environment image on the image output device 221 constituting the output interface 220 (FIG. 5/STEP218). Thus, as illustrated in FIG. 9A, for example, the result of superimposing a texture image T on the second work environment image in an area surrounded by a set EC of edge points in the actual machine image Qi is outputted as the second label image. The color of the texture image T is changeable according to preference of the operator. In addition, as illustrated in FIG. 9B, for example, the result of superimposing a mark image M on the third work environment image near the actual machine image Qi is outputted as the third label image. For the mark image M, a symbol (character) according to preference of the operator can be set.

When the target actual machine is not included in the shooting range of the third work environment image in the real space coordinate system (FIG. 5/STEP129 . . . NO) or when the actual machine image Qi indicating the work machine 40 is not extracted at the position of the target actual machine in the third work environment image coordinate system (FIG. 5/STEP130 . . . NO), a specifying notice indicating that the actual machine image corresponding to the target actual machine is not present in the first to third work environment images is transmitted to the remote operating device 20 (FIG. 5/STEP132).

In the remote operating device 20, when the specifying notice is received through the remote radio communication device 222 (FIG. 5/C24), the specifying notice is displayed on the image output device 221 constituting the output interface 220. The specifying notice notifies information on which of the first to third work environment images includes the target actual machine or information on that the target actual machine is not included in any of the first to third work environment images.

In the remote operating device 20, the image output device 221 may have a function of switching between screens of the first to third work environment images whether the target actual machine is included in each of the shooting range or not.

The texture image T and the mark image M are in common between the first client and the second client performing intercommunication. For example, when a red texture image T is outputted as the first label image for the actual machine image Qi, on the image output device 221 of the first client, the texture image T of the actual machine image Qi is also red on the image output device 221 of the second client.

(Effects)

According to the work assisting system of the configuration and the work assisting server 10 constituting it, the first work environment image indicating the situation of the work site acquired through the image pickup device (for example, the image pickup device 412 loaded on the work machine 40) is outputted on the output interface 220 constituting each of the plurality of remote operating devices 20 (see FIG. 4/STEP204 and FIG. 6 to FIG. 8). According to the label image request accompanied with the identifier from the first remote operating device 20, whether or not the actual machine image Qi corresponding to the linked work machine identified by the identifier is included in the first work environment image is determined (see FIG. 5/STEP123, FIG. 5/STEP124). When the actual machine image Qi corresponds to the linked work machine, the first label image is outputted on the output interface 220 of the remote operating device 20 which is at least one of the first and second remote operating devices (see FIG. 5/STEP214, FIG. 9A and FIG. 9B). The "first label image" indicates that the actual machine image Qi is the linked work machine.

Thus, by the operator of the first client (first remote operating device 20) transmitting the label image request accompanied with the first identifier to the work assisting server 10 through the operation of the input interface 210, whether or not any of the actual machine images Qi included in the first work environment image outputted on the output interface 220 of the first client corresponds to the own machine which is the operation target by the first client or the operator identified by the first identifier can be checked. Further, by the operator of the first client transmitting the label image request accompanied with the second identifier to the work assisting server 10 through the operation of the input interface 210, whether or not any of the actual machine images Qi included in the first work environment image outputted on the output interface 220 of the first client corresponds to the other machine which is the operation target by the second client or its operator identified by the second identifier can be checked.

Similarly, by the operator of the first client (first remote operating device 20) transmitting the label image request accompanied with the first identifier to the work assisting server 10 through the operation of the input interface 210, the operator of the second client can be enabled to check whether or not any of the actual machine images Qi included in the first work environment image outputted on the output interface 220 of the second client (second remote operating device 20) corresponds to the other machine operated by the first client or the operator thereof identified by the first identifier. Further, by the operator of the first client transmitting the label image request accompanied with the second identifier to the work assisting server 10 through the operation of the input interface 210, the operator of the second client can be enabled to check whether or not any of the actual machine images Qi included in the first work environment image outputted on the output interface 220 of the second client corresponds to the own machine which is the operation target by the second client or the operator thereof identified by the second identifier.

Thus, the plurality of operators share the recognition of which remote operating device 20 remotely operates a work machine 40 shown in the first work environment image outputted on the output interface constituting the remote operating device.

Further, when none of one or more actual machine images Qi included in the first work environment image correspond to the linked work machine, the second work environment image including an actual machine image Qj corresponding to the linked work machine is outputted on the output interface 220 of the remote operating device 20 together with the second label image (see FIG. 5/STEP126-STEP128, STEP216). The "second label image" indicates that the actual machine image Qj is the linked work machine.

Thus, by the operator of the first client (first remote operating device 20) transmitting the label image request accompanied with the first identifier to the work assisting server 10 through the operation of the input interface 210, whether or not any of the actual machine images Qj included in the second work environment image outputted on the output interface 220 of the first client corresponds to the own machine can be checked. Further, by the operator of the first client transmitting the label image request accompanied with the second identifier to the work assisting server 10 through the operation of the input interface 210, whether or not any of the actual machine images Qj included in the second work environment image outputted on the output interface 220 of the first client corresponds to the other machine can be checked.

Similarly, by the operator of the first client transmitting the label image request accompanied with the first identifier to the work assisting server 10 through the operation of the input interface 210, the operator of the second client can be enabled to check whether or not any of the actual machine images Qj included in the second work environment image outputted on the output interface 220 of the second client corresponds to the other machine. Further, by the operator of the first client transmitting the label image request accompanied with the second identifier to the work assisting server 10 through the operation of the input interface 210, the operator of the second client can be enabled to check whether or not any of the actual machine images Qj included in the second work environment image outputted on the output interface 220 of the second client corresponds to the own machine.

Thus, the plurality of operators share the recognition of which remote operating device 20 remotely operates a work machine 40 shown in the second work environment image outputted on the output interface constituting the remote operating device.

Other Embodiments of Present Invention

In the embodiment described above, the work assisting server 10 is constituted of one or more servers separate from each of the remote operating device 20 and the work machine 40 (see FIG. 1); however, as another embodiment, the work assisting server 10 may be a component of the remote operating device 20 or the work machine 40. Each of the individual components 121 and 122 of the work assisting server 10 may be components of two or more intercommunicable devices of the remote operating devices 20 and the work machines 40.

When the second assisting processing element 122 receives the label image request not accompanied with the identifier based on the communication with the first client (first remote operating device 20) (see FIG. 5/C13), the second assisting processing element 122 may recognize which work machine 40 of the plurality of work machines 40 corresponds to the actual machine image Qi, based on the position of the actual machine image Qi in the first work environment image and the respective real space positions of the plurality of work machines 40 stored and held in the database 102. Then, the second assisting processing element 122 causes the label image indicating which work machine 40 corresponds to the actual machine image Qi to be outputted on the output interface 220 of at least one remote operating device 20 of the first and second remote operating devices based on the communication with the at least one remote operating device 20.

According to the work assisting server 10 or the like of the configuration, when the work machine 40 is shown in the work environment image outputted on the output interface constituting the first remote operating device, which remote operating device 20 or which operator remotely operates the work machine 40 is recognized. Then, the label image indicating the result of the recognition is outputted on the output interface of at least one remote operating device of the first and second remote operating devices. As a result, each of the operators can be enabled to easily recognize which remote operating device the actual machine image outputted on the output interface constituting the remote operating device corresponds to the remote operation target of.

In the embodiment described above, whether or not the target actual machine is included in the first to third work environment images is determined based on the real space position of the work machine 40 measured in the positioning device 460; however, as another embodiment, the image analysis processing may be executed on each of the work environment images and thus the actual machine image Qi indicating the work machine 40 may be extracted in the first work environment image.

For example, when the image analysis processing is executed on the first work environment image, the actual machine images Qi (i=1, 2, . . . ) indicating the work machines 40 are extracted in the first work environment image by the image analysis processing (FIG. 7).

Subsequently, based on the position of the actual machine image Qi in the first work environment image coordinate system, the real space position of the work machine 40 corresponding to the actual machine image Qi is obtained. At the time, the real space distance from the image pickup device (image pickup device 412, for example) to the work machine 40 is estimated based on the size of the actual machine image Qi in the first work environment coordinates. When the distance to an object an image of which is picked up acquired by a ranging sensor such as a TOF sensor is included as a pixel value of the first work environment image, the real space distance from the image pickup device (image pickup device 412, for example) to the work machine 40 may be estimated based on the pixel value. Further, by coordinate transformation of the position of the work machine 40 in an image pickup device coordinate system to the real space coordinate system, the position of the target actual machine (work machine 40) in the real space coordinate system is recognized or calculated. At the time of the coordinate transformation, the position of the target actual machine in the image pickup device coordinate system is recognized and a coordinate transformation factor (matrix or quaternion) indicating the position and posture of the image pickup device in the real space coordinate system is used. The coordinate transformation factor is registered in association with the identifier of the image pickup device (consequently, an image identifier) in the database 102.

Then, the presence/absence in the first work environment image of the actual machine image Qi indicating the work machine 40 having the real space position that matches with or corresponds to the real space position of the target actual machine registered in the database 102 is determined.

In the embodiment described above, one work machine is the target of the label image request; however, a plurality of work machines may be the target of the label image request. For example, by imparting red to the texture image T of the label image of the first work machine and white or the like to the texture image T of the label image of the second work machine, the plurality of operators share the recognition.

In the embodiment described above, the label image cannot be set when the specifying notice indicating that the actual machine image corresponding to the target actual machine is not present in the first to third work environment images is transmitted to the remote operating device 20 (FIG. 5/STEP132); however, as another embodiment, the label image may be set even when the actual machine image corresponding to the target actual machine is not present in the first to third work environment images. For example, it is the case where there are few usable image pickup devices at the work site or the case where the work machine 40 is being transported to the work site by a carrier and is to arrive at the work site henceforward. In this case, by setting the label image beforehand, the need of performing recognition sharing work again is eliminated and thus workability improves.

When the result of determining whether or not the real space position of the linked work machine is included in the real space image pickup range of the image pickup device is negative, the second assisting processing element 122 executes selective output processing of identifying, as a specified image pickup device, the image pickup device capable of including the real space position of the linked work machine in the real space image pickup range of the image pickup device, and causing the label image indicating the presence of the linked work machine at the specified position in the work environment image acquired by the specified image pickup device to be outputted on the remote output interface 220 of each of the plurality of remote operating devices 20.

In this case, when the real space position of the linked work machine is not included in the real space image pickup range of one image pickup device, an alternative work environment image acquired by another image pickup device capable of including the real space position of the linked work machine in the real space image pickup range thereof can be outputted on the remote output interface 220 of each of the remote operating devices 20. Thus, the plurality of operators can share the recognition about the presence of the linked work machine.

The second assisting processing element 122 identifies at least one actual machine image pickup device 412 loaded on at least one work machine of the plurality of work machines 40 as the specified image pickup device.

In this case, when the linked work machine which is the target of the label image request is not included in the work environment image individually outputted on the remote output interface 220 of each of the plurality of remote operating devices 20, the work environment image outputted on the remote output interface 220 of another remote operating device 20 including the linked work machine can be outputted. Thus, the plurality of operators of the plurality of remote operating devices 20 can share the recognition about the presence of the linked work machine which is the target of the label image request.

When the second assisting processing element 122 cannot identify the at least one actual machine image pickup device 412 loaded on the at least one work machine 40 as the specified image pickup device, the second assisting processing element 122 identifies the image pickup device not loaded on any of the plurality of work machines 40 as the specified image pickup device.

In this case, when at least one image pickup device loaded on at least one work machine is not identified as the specified image pickup device, the work environment image acquired by the specified image pickup device which is the image pickup device (for example, the image pickup device installed at the work site) not loaded on any of the plurality of work machines can be outputted on the output interface of each of the plurality of remote operating devices. Thus, the plurality of operators of the plurality of remote operating devices can share the recognition about the presence of the linked work machine which is the target of the label image request.

When the work environment image outputted on the remote output interface 220 of the one remote operating device 20 and the work environment image outputted on the remote output interface 220 of another remote operating device 20 is the same, the second assisting processing element 122 causes the information indicating the other remote operating device 20 to be outputted on the remote output interface 220 of the one remote operating device 20.

In this case, when the work environment image outputted on the remote output interface 220 of the one remote operating device 20 is outputted also on the remote output interface 220 of the other remote operating device 20, the information indicating the other remote operating device 20 is outputted on the remote output interface 220 of the one remote operating device 20.

When the label image outputted on the remote output interface 220 of one remote operating device 20 and the label image outputted on the remote output interface 220 of another remote operating device 20 indicate the presence of the same linked work machine, the second assisting processing element 122 causes the label image to be outputted on the remote output interfaces 220 of the one remote operating device 20 and the other remote operating device 20 in a common form.

In this case, since the label image indicating the presence of the same linked work machine is outputted in the common form on the remote output interfaces 220 of the plurality of remote operating devices 20, the plurality of operators can share the recognition about the presence of the linked work machine which is the target of the label image request.

The second assisting processing element 122 causes the plurality of label images to be outputted in a mutually identifiable form on the remote output interface 220 of each of the plurality of remote operating devices 20.

In this case, since the plurality of label images are outputted in the mutually identifiable form on the remote output interface of each of the plurality of remote operating devices 20, the plurality of operators can share the recognition about the identification and presence of each of the plurality of linked work machines which are the targets of the label image request.

The second assisting processing element 122 determines whether or not the actual machine image corresponds to the linked work machine, based on the position of the actual machine image in the work environment image corresponding to the work machine and the real space position of the linked work machine stored and held in the database, and, on the condition that the result of the determination is positive, causes the label image indicating the presence of the linked work machine to be outputted on the remote output interface 220 of each of the plurality of remote operating devices 20.

In this case, by the presence/absence of the output of the label image, the operator can be enabled to recognize whether or not the actual machine image included in the work environment image outputted on the output interface of one remote operating device corresponds to the linked work machine which is the remote operation target by the one remote operating device.

The second assisting processing element 122 recognizes which work machine 40 corresponds to the actual machine image, based on the position of the actual machine image in the work environment image corresponding to the work machine 40 and the respective real space positions of the plurality of work machines 40 stored and held in the database 102, and causes the label image indicating which work machine 40 corresponds to the actual machine image to be outputted on at least one remote output interface 220 of at least one remote operating device 20 based on the communication with the plurality of remote operating devices 20.

In this case, when the work machine 40 is shown in the work environment image outputted on the remote output interface 220 constituting the remote operating device 20, which remote operating device 20 or which operator remotely operates the work machine 40 is recognized. Then, the label image indicating the result of the recognition is outputted on the output interface of at least one remote operating device of the first remote operating device and the second remote operating device. As a result, each of the operators can be enabled to easily recognize which remote operating device the actual machine image outputted on the output interface constituting the remote operating device corresponds to the remote operation target of.

REFERENCE SIGNS LIST

10 . . . work assisting server, 20 . . . remote operating device (client), 40 . . . work machine, 102 . . . database, 121 . . . first assisting processing element, 122 . . . second assisting processing element, 210 . . . remote input interface, 220 . . . remote output interface, 410 . . . actual machine input interface, 412 . . . actual machine image pickup device, 420 . . . actual machine output interface, 440 . . . work attachment (actuation mechanism).

The invention claimed is:

1. A work assisting server for assisting a remote operation of each of a plurality of work machines using corresponding each of a plurality of remote operating devices, the work assisting server comprising:
a database configured to store and hold an identifier of the remote operating device, an identifier of a linked work machine, which is the work machine linked with the remote operating device, and a real space position of the linked work machine in association with one another;
a first assisting processing element configured to cause a work environment image according to a picked-up image of a work site acquired through an image pickup devices to be outputted on an output interface of each of the plurality of remote operating devices based on communication with the corresponding each of the plurality of remote operating devices; and
a second assisting processing element configured to recognize, in a case of receiving a label image request accompanied with the identifier of the linked work machine based on communication with each of the plurality of remote operating devices, the real space position of the linked work machine stored and held in the database in association with the identifier, determine whether or not the real space position of the linked work machine is included in a real space image pickup range of the image pickup device, and, when a result of the determination is positive, cause a label image indicating presence of the linked work machine at a specified position in the work environment image corresponding to the real space position of the linked work machine to be outputted on the output interface of each of the plurality of remote operating devices.

2. The work assisting server according to claim 1, wherein when the result of determining whether or not the real space position of the linked work machine is included in the real space image pickup range of one image pickup device is negative, the second assisting processing element executes selective output processing of identifying, as a specified image pickup device, the image pickup devices capable of including the real space position of the linked work machine in a real space image pickup range of another image pickup device, and causing the label image indicating presence of the linked work machine at the specified position in the work environment image acquired by the specified image pickup device to be outputted on the output interface of each of the plurality of remote operating devices.

3. The work assisting server according to claim 2, wherein the second assisting processing element identifies at least one image pickup device loaded on at least one work machine of the plurality of work machines as the specified image pickup device.

4. The work assisting server according to claim 3, wherein when the second assisting processing element cannot identify the at least one image pickup device loaded on the at least one work machine as the specified image pickup device, the second assisting processing element identifies an image pickup device not loaded on any of the plurality of work machines as the specified image pickup device.

5. The work assisting server according to claim 3, wherein when the work environment image outputted on the output interface of one remote operating device and the work environment image outputted on the output interface of another remote operating device is same, the second assisting processing element causes information indicating the other remote operating device to be outputted on the output interface of the one remote operating device.

6. The work assisting server according to claim 1, wherein when the label image outputted on the output interface of one remote operating device and the label image outputted on the output interface of another remote operating device indicate presence of the same linked work machine, the second assisting processing element causes the label image to be outputted on the output interfaces of the one remote operating device and the other remote operating device in a common form.

7. The work assisting server according to claim 1, wherein the second assisting processing element causes a plurality of the label images to be outputted in a mutually identifiable form on the output interface of each of the plurality of remote operating devices.

8. The work assisting server according to claim 1, wherein the second assisting processing element determines whether or not an actual machine image corresponds to the linked work machine, based on a position of the actual machine image in the work environment image corresponding to the work machine and the real space position of the linked work machine stored and held in the database, and, on a condition that a result of the determination is positive, causes the label image indicating presence of the linked work machine to be outputted on the output interface of each of the plurality of remote operating devices.

9. The work assisting server according to claim 1, wherein the second assisting processing element recognizes which work machine corresponds to an actual machine image, based on a position of the actual machine image in the work environment image corresponding to the work machine and respective real space positions of the plurality of work machines stored and held in the database, and causes the label image indicating which work machine corresponds to the actual machine image to be outputted on at least one output interface of at least one of the plurality of remote operating devices based on the communication with the at least one of the plurality of remote operating devices.

10. A work assisting system comprising the work assisting server according to claim 1 and the remote operating devices.

* * * * *